United States Patent [19]

Cornwell

[11] 4,204,344
[45] May 27, 1980

[54] SHOE HEELS

[75] Inventor: John V. Cornwell, Leicester, England

[73] Assignee: Cornwell Components Limited, Leicester, England

[21] Appl. No.: 900,749

[22] Filed: Apr. 27, 1978

[30] Foreign Application Priority Data

Feb. 2, 1978 [GB] United Kingdom ............ 4255/78

[51] Int. Cl.² ................ A43B 21/00; A43D 33/00
[52] U.S. Cl. ............................ 36/34 A; 12/147 A
[58] Field of Search .................... 36/34 A, 34 R; 12/147 R, 147 A

[56] References Cited

U.S. PATENT DOCUMENTS

| 2,984,021 | 5/1961 | Bichl | 36/34 A |
| 3,055,125 | 9/1962 | Ronci | 36/34 A |
| 3,119,192 | 1/1964 | Ronci | 36/34 A |
| 3,184,865 | 5/1965 | Ronci | 36/34 A |

FOREIGN PATENT DOCUMENTS

| 212341 | 1/1958 | Australia | 36/34 A |
| 1224398 | 2/1960 | France | 36/34 A |
| 1227452 | 3/1960 | France | 36/34 A |
| 1242344 | 8/1960 | France | 36/34 A |
| 957621 | 5/1964 | United Kingdom | 36/34 A |

Primary Examiner—James Kee Chi
Attorney, Agent, or Firm—Kalish & Gilster

[57] ABSTRACT

A heel for a shoe is of plastics material with a steel reinforcement member. An aperture is provided for a pin of a top piece. A cavity surrounds the top of the reinforcement member to allow for expansion on the insertion of the pin. The manufacture of heels by injection moulding is also described.

8 Claims, 2 Drawing Figures

SHOE HEELS

The invention relates to heels for shoes, that is steel-reinforced heels which are used particularly on ladies' shoes. One of the problems with such heels is that they tend to split when a top piece is attached or in subsequent use.

A heel according to the invention comprises a moulding of plastics material, a steel reinforcement member integrally moulded longitudinally therein, an aperture for a pin of a top piece formed in the member, and a cavity surrounding the top of the reinforcement member to allow for the expansion of the reinforcement by the pin of a top piece.

The heel is of mouldable thermoplastic, preferably of polystyrene, polypropylene or ABS resin, and formed by injection moulding around the reinforcement member. The reinforcement member may be a solid tube made of rod, or by turning, and drilling the aperture in one end, but is preferably a hollow tube made by folding a strip of spring steel.

The cavity is preferably produced by an annular filler used to embrace and secure the reinforcement member during the moulding process. the cavity itself may be straight-sided tubular, but preferably tapers down the stem of the heel. The cavity annulus should be as thin as possible and about one quarter of an inch deep. The thickness tends to be dictated by that of a suitable filler, but may be 30 thousandths of an inch or less.

The invention includes a process of manufacturing such a heel which comprises securing a steel reinforcement member by means of an annular filler, integrally moulding plastics material about the member, and removing the filler. The heel is then ready for incorporation into a shoe, and a top piece can subsequently be attached by driving its pin into the aperture in the reinforcement member.

The invention is illustrated by way of example in the drawings of which

Figure 1:
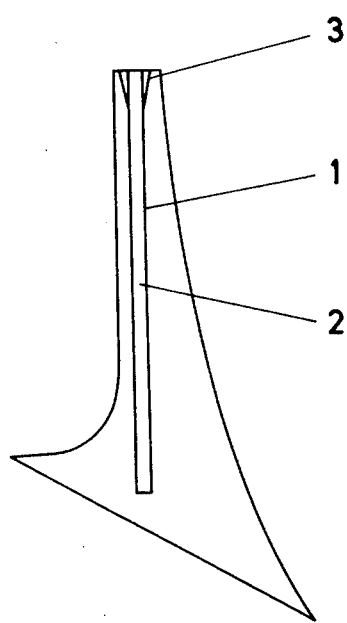
FIG. 1 is a longitudinal section through a heel of polystyrene.

With reference to FIG. 1 the heel has a spring steel tubular reinforcement member 1, having a longitudinal split (not shown) therein to allow expansion, integrally moulded in the heel. The reinforcement member 1 has a central aperture 2 extending from the top down towards the seat of the heel for a pin of a top piece (not shown). A tapered cavity 3, slightly enlarged in the drawing for clarity, surrounds the top of the member 1 to allow for the expansion of the member 1 by the pin of the top piece.

Figure 2:
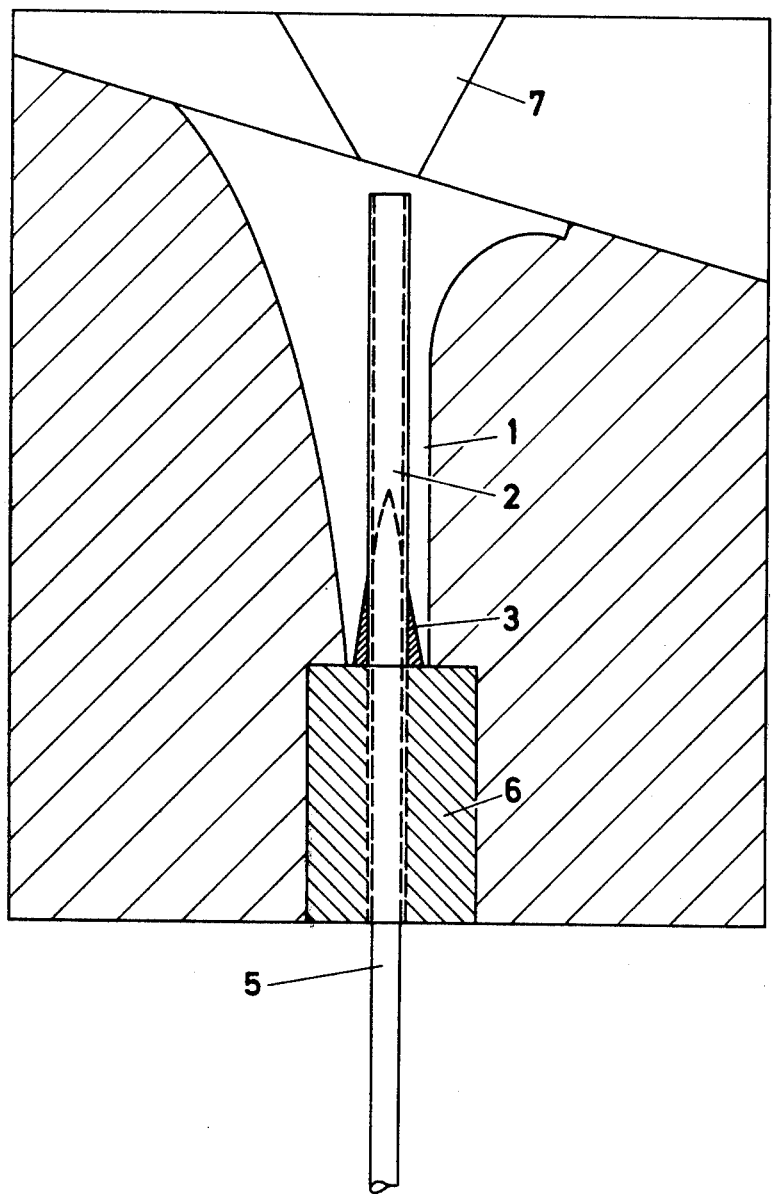
FIG. 2 illustrates the same heel in a mould in the process of manufacture.

With reference to FIG. 2, the reinforcement member 1 is secured in the mould on the point of a rod 5. The rod 5 extends through a block 6 on which is a tapered filler to produce the cavity 3 in the finished heel. Mould material surrounds the block 6 and contains a cavity in which the heel itself is to be moulded. Polystyrene is injected through an aperture 7 in the top of the drawing. After injection moulding, the top of the mould and the rod 5 are removed, so that the finished heel can be taken out of the mould with a cavity 3 in place of the filler.

What we claim is:

1. A heel for a shoe comprising a moulding of plastics material, a steel reinforcement member integrally moulded longitudinally therein, an aperture for a pin of a top piece formed in the member, and a cavity surrounding the top or shoe remote end of the reinforcement member to allow for the expansion of the reinforcement by the pin of a top piece.

2. A heel according to claim 1 in which the reinforcement member is a hollow tube made by folding a strip of spring steel.

3. A heel according to claim 1 in which the cavity tapers down the stem of the heel.

4. A narrow shoe heel comprising a body of moulded plastic, an elongated metallic reinforcement member extending longitudinally of said heel body being integrally moulded therewith, with one end of said member being imbedded therein and the other end of said member being substantially aligned wth the proximate or shoe remote end of said heel body, the said other end of said reinforcement member having an endwise opening, a top piece, a pin formed with said top piece and projecting from the heel directed side thereof into said reinforcement member opening, there being an expansion volume in said heel body surrounding said reinforcement member in its end portion containing said opening for permitting of uninhibited expansion of said reinforcement member with the received pin.

5. A narrow shoe heel as defined in claim 4 and further characterized by said heel body volume tapering inwardly from the proximate end of said body.

6. A narrow shoe heel as defined in claim 4 and further characterized by said volume opening at the outer end thereof through the proximate end of said heel body and tapering inwardly therefrom for surrounding the reinforcement member within the proximate end portion of said heel body.

7. A narrow shoe heel as defined in claim 6 and further characterized by said reinforcement member from the inner end of said volume being fully imbedded throughout the balance of the extent thereof within said heel body.

8. A narrow shoe heel as defined in claim 7 and further characterized by said top piece constituting a closure for the outer end of said volume.

* * * * *